June 23, 1970     J. E. LAKE     3,517,238

SQUIRREL CAGE ROTOR AND METHOD OF BUILDING THE SAME

Filed April 4, 1968

*Welding by Electron beam.*

Inventor:
John E. Lake,
by *Paul A. Frank*
His Attorney.

United States Patent Office 3,517,238
Patented June 23, 1970

3,517,238
SQUIRREL CAGE ROTOR AND METHOD
OF BUILDING THE SAME
John E. Lake, Schenectady, N.Y., assignor to General
Electric Company, a corporation of New York
Filed Apr. 4, 1968, Ser. No. 718,827
Int. Cl. H02k 3/06
U.S. Cl. 310—211                                     3 Claims

ABSTRACT OF THE DISCLOSURE

A rotor for use in ultra-high speed squirrel cage induction motors and a method for building the rotor. A solid steel shaft is provided which is machined with a stepped-up portion having a plurality of longitudinal holes drilled therethrough for the insertion of rotor bars. When properly inserted, the ends of the rotor bars protrude through both sides of the stepped-up portion of the shaft and into corresponding holes drilled in two end ring assemblies, one of which is mounted adjacent to each end of the stepped-up portion. Each end ring assembly comprises a composite of concentric members, with each member comprising a metal with a modulus of elasticity so chosen that the combined stress pattern of the overall assembly permits the end rings to deform only in the elastic range when subjected to varying severe rotational and thermal loads. The materials and their dimensions are so chosen that the combined stress and deformation patterns of the overall assembly assure that contact between the end rings and the shaft at the internal surfaces of the end rings will be maintained when subjected, singularly or in combination, to varying severe rotational and thermal loads. The bars are connected to the end rings by induction brazing or by electron beam welding in such a manner as to prevent any change of metal temper or elastic limit in the end rings and bars excepting the area immediately adjacent to the joint.

---

The invention relates to dynamoelectric machines and, more specifically, to squirrel cage rotor constructions for ultra-high speed induction motors. The invention herein described was made in the course of or under a contract with the United States Department of the Air Force.

The need for a highly reliable, maintenance-free electric motor for us in cryogenic machinery aboard space vehicles is well known. Such motors must be compact, light in weight and capable of providing a long life of operation under ultra-high speed conditions in the order of 100,000 r.p.m. In meeting this need, a new generation of induction motors, which are usually integrally mounted within a compressor, has been produced. While such machinery has shown much potential for solving the problems presented by high-speed use, the squirrel cage rotor construction of currently used induction motors has placed a severe limitation on the high-speed/long-life capability of existing machinery.

In the ultra-high speed compressor, the maintenance of a high precision balance in the rotating shaft, which may be supported by gas film bearings, is essential in providing an adequate operational life span. In existing squirrel cage rotors, however, the rotor bars and end ring assembly are cast of low strength high electrical conductivity metals whereby the rotor bars and end rings consist of one integral member. When these rotors are subjected to ultra-high-speed conditions, the rotor bars and end rings deform due to the low elastic properties of cast materials and the metal creeps. Severe rotor unbalance is the direct result of this inelastic deformation, which unbalance is aggravated by the extremely high rotation speeds to which the rotor is subjected. The ultimate result is the greatly shortened life of the compressor, an undesirably low maximum operational speed, and the possibility of damage to adjacent elements, such as bearings, if the unbalance should become so great as to cause the rotor to bend or break.

Accordingly, it is one object of this invention to provide a squirrel cage rotor for an induction motor, which rotor is capable of operating at ultra-high speeds for long periods.

It is another object of this invention to provide a squirrel cage rotor which is light in weight and compact for use in space vehicle applications.

It is a further object of this invention to provide a method for building a rotor bar and end ring assembly which will not deform in the plastic range when subjected to severe thermal and rotational loadings.

It is a further object of this invention to provide a method for constructing a rotor in which elastic deformation is limited so that all parts remain in contact one to the other when subjected to severe thermal and rotational loadings.

In carrying out this invention in the preferred form, a squirrel cage rotor is provided for a high-speed induction motor. A solid steel shaft is provided having a stepped-up portion with longitudinal holes drilled therethrough for the insertion of a plurality of rotor bars. Two composite end ring assemblies are provided with one mounted on the shaft adjacent each end of the stepped-up portion. The end ring assemblies have a plurality of longitudinal holes corresponding to the holes of the stepped-up portion of the shaft for retaining the ends of the rotor bars. The rotor bars are joined to the end ring assembly in such a manner as to prevent any change of temper in the bulk materials of the rings or bars. In the case of induction brazed joints this requires the selection of a brazing alloy with a melting temperature lower than the tempering temperature of the end rings and rotor bars. Also, it requires rapid and controlled application of induction heating to prevent excessive temperatures in the rotor bars and end rings. In the case of joining by electron beam welding, the region of high temperature is limited to the metal immediately adjacent to the joint by the concentration of the electron beam and the rapidity of the welding process. Each end ring assembly includes an outer safety ring which is mounted over a highly conductive metallic inner ring by an interference fit. The outer safety ring consists of a metal of a high modulus of elasticity which will elastically cooperate with the inner ring metal to prevent any unbalance of the rotor by preventing any plastic deformation of elastic deformation to the point of losing contact between mating parts during severe thermal and rotational loadings.

The specification concludes with claims which particularly point out and distinctly claim the invention which is sought to be protected and a preferred embodiment is disclosed in the following detailed description in connection with the accompanying drawings in which:

Figure 1:
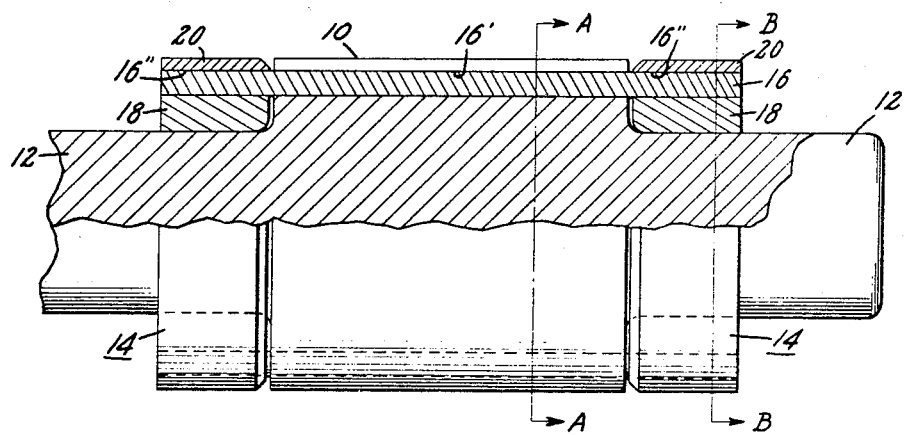
FIG. 1 shows a partial longitudinal sectional view of a rotor which is constructed in accordance with the present invention.
Figure 2:
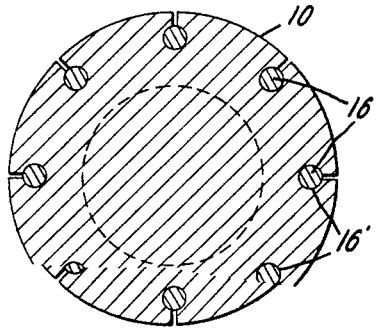
FIG. 2 is section A—A of the rotor in FIG. 1 and shows a cross-sectional view of a stepped-up portion of the solid steel shaft into which the rotor bars are inserted.
Figure 3:
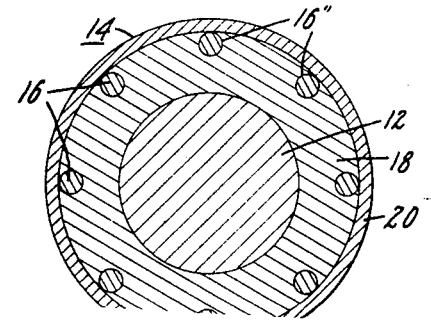
FIG. 3 is section B—B of the rotor in FIG. 1 and shows a cross-sectional view of an end ring assembly which is mounted on the shaft adjacent to the stepped-up portion.

In the drawings, in which like numerals are used to indicate like parts throughout the various views thereof, a preferred embodiment of this invention is shown in FIG. 1 as a composite squirrel cage rotor. The rotor comprises a stepped-up portion 10 of a solid steel shaft 12, two end ring assemblies 14, and a plurality of rotor bars 16 which are retained in longitudinal holes 16' and 16" formed in the stepped-up portion 10 and the end ring assemblies 14, respectively.

The end ring assemblies 14 are mounted on shaft 12 adjacent each end of the stepped-up portion 10 and each assembly 14 consists of two concentric rings 18 and 20, which are formed of specially selected metals to be described later in the disclosure. The inner concentric end rings 18 are provided with longitudinal holes 16" for retaining the ends of the rotor bars 16 and are secured to the shaft 12 by an interference fit. The bars 16 are joined to the inner rings 18 within holes 16" by an induction brazing or an electron beam welding process in such a manner that the metal temper and elastic properties of the members 16 and 18 are not changed except immediately adjacent to the joints.

The outer concentric end rings 20 are mounted on the inner rings 18, likewise, by an interference fit. The metal used for the outer ring 20 is of such a very high modulus of elasticity as to act as a safety ring around the metal of the inner ring 18, which is highly conductive but is necessarily of a low modulus of elasticity. The outer ring 20 thereby provides a combined stress pattern for the overall ring assembly 14, which pattern will insure that the assembly 14 will remain fully elastic and will maintain the contact between the parts at ultra-high speeds and under varying thermal and rotational loadings.

The specifications of the rings 18 and 20, which were successfully used in two devices of the preferred embodiment are as follows:

(I) In the first device a ring, consisting of chrome-moly-vanadium steel, with a 2.71-inch outside diameter and a 2.43-inch inside diameter was utilized as the outer safety ring 20. The steel used had the following chemical analysis: 0.45% C, 0.60% Mn, 0.50% Mo, 0.30% Si, 1.00% Cr, 0.30% V, and Fe remainder. (Modulus of elasticity: $30 \times 10^6$ lb./in.$^2$ at room temperature.)

The inner ring 18 consisted of a copper-cobalt-beryllium alloy (beryllium copper), had a 2.43-inch outside diameter and a 1.85-inch inside diameter. Its chemical analysis was: 0.1% Ni, 0.1% Al, 0.1% Si, 0.1% Fe, 0.4–0.7% Be, 2.53–2.70% Co, Cu remainder. (Modulus of elasticity: $18 \times 10^6$ lb./in.$^2$ at room temperature.)

(II) In a second device, a steel ring with a 1.54-inch outside diameter and a 1.37-inch inside diameter was utilized as the outer safety ring 20. It consisted of the same metal used in the ring 20 of the first device described above.

The inner ring 18 of the second device, consisting of aluminum-magnesium-silicon alloy, had an outside diameter of 1.37 inches and an inside diameter of 0.92 inch. Its chemical analysis was: 0.4–0.8% Si, 0.7% Fe, 0.15–0.4% Cu, 0.15% Mn, 0.8–1.2% Mg, 0.04–0.35% Cr, 0.25% Zn, 0.15% Ti, Al remainder. (Modulus of elasticity: $10 \times 10^6$ lb./in.$^2$ at room temperature.)

In building the above-specified devices, the following basic steps were followed:

(1) A solid steel shaft 12 of the type used in high-speed machinery was machined with a stepped-up portion 10.

(2) A plurality of longitudinal holes 16' were drilled through the stepped-up portion of shaft 12 to serve as retainers for rotor bars 16.

(3) End rings 18 were constructed of a high electric conductivity metal with longitudinal holes, which correspond to the holes 16' in the stepped-up portion of shaft 12, formed therein.

(4) The end rings 18 were mounted on shaft 12 by an interference fit with one end ring positiond adjacent each end of stepped-up portion 10. The holes 16' and 16" were properly aligned before securing the ring 18 to shaft 12.

(5) Rotor bars and all weld or braze areas adjacent to holes 16' and 16" were thoroughly cleaned in preparation for a joining process.

(6) Rotor bars 16 were inserted in holes 16' and 16" and the ends of bars 16 were joined to rings 18 within hole 16" by a rapid fusion joining process, such as induction brazing or electron beam welding.

(7) The outer round surfaces of inner rings 18 were machined down so as to visually inspect the rotor bar fused joints therein, near the outer periphery of ring 18.

(8) An outer safety ring 20 was mounted over the periphery of each inner ring by an interference fit. (Heating the ring to approximately 450° F. maximum.)

A composite squirrel cage rotor, which comprises the preferred embodiment of this invention, has been described and a preferred method for building the rotor has been specified. It should be understood that, while there has been shown a particular embodiment of this invention, it will be obvious to those skilled in the art that various changes and modifications may be made without departing from the spirit and scope of the invention.

What I claim as new and desire to secure by Letters Patent of the United States is:

1. A rotor for an ultra-high speed squirrel cage induction motor comprising, in combination:
   a solid steel shaft;
   a stepped-up portion formed on said shaft;
   longitudinal holes drilled through said stepped-up portion of said shaft;
   rotor bars inserted in said longitudinal holes;
   rotor bar ends protruding through both ends of said stepped-up portion of said shaft;
   said rotor bars formed of a metal of high electrical conductivity;
   an end ring assembly mounted on said shaft adjacent to each end of said stepped-up portion of said shaft;
   said end ring assembly comprising:
      an inner ring, formed of a high electrical conductivity metal,
      a plurality of longitudinal holes formed in said inner ring for the insertion of said rotor bar ends,
      an outer ring mounted on said inner ring,
      said outer ring formed of a metal with a very high modulus of elasticity,
      said outer ring being secured on said inner ring by an interference fit,
      said rotor bar ends being joined within said longitudinal holes in such a manner that the temper or elastic properties of the bulk material of said rings and said bars is not changed.

2. A rotor for an ultra-high speed squirrel cage induction motor according to claim 1 wherein said inner ring of said end ring assembly and said rotor bars are formed of a metal from the group consisting of beryllium copper or aluminum-magnesium-silicon alloy; and said outer ring consists of chrome-moly-vanadium steel.

3. A method for building a squirrel cage rotor comprising the steps of:
   drilling a plurality of longitudinal holes through a stepped-up portion of solid steel shaft;
   forming end rings of a highly conductive metal with longitudinal holes corresponding to the holes of the stepped-up portion of the shaft;
   aligning the holes of the end rings with those of the stepped-up portion of the shaft;
   mounting an end ring adjacent each end of the stepped-up portion of the shaft by an interference fit;
   thoroughly cleaning a plurality of rotor bars and the metal surrounding the longitudinal holes in the end rings and stepped-up portion of the shaft;
   inserting rotor bars into the longitudinal holes so that the ends of the bars extend into the end rings;

joining the induction bars within the end rings in such a manner that the elastic properties and metal temper of the bulk material of the end rings and bars is not changed;

machining the outer rounded surface of the end rings until the outer periphery of each end ring is adjacent the rotor bars;

forming outer safety rings of a metal with a *high modulus of elasticity* for mounting on the end rings;

and interference fitting the outer safety rings over the end rings, whereby the stress pattern of the overall end ring assembly prevents plastic deformation or loss of part-to-part contact of the assembly under severe thermal and rotation loadings.

References Cited

UNITED STATES PATENTS

| | | | |
|---|---|---|---|
| 2,461,566 | 2/1949 | Morrill | 310—211 |
| 2,499,390 | 3/1950 | Joy | 310—211 |
| 2,781,465 | 2/1957 | Schuff | 310—211 |
| 3,327,143 | 6/1967 | Rosenthal | 310—211 X |

RODNEY D. BENNETT, Primary Examiner

D. C. KAUFMAN, Assistant Examiner

U.S. Cl. X.R.

29—598; 310—210, 271